United States Patent
Kenderov et al.

(10) Patent No.: US 8,102,422 B1
(45) Date of Patent: Jan. 24, 2012

(54) SYSTEM, METHOD AND COMPUTER PROGRAM PRODUCT FOR PRESENTING AN OPTION TO RECEIVE ADVERTISEMENT CONTENT

(75) Inventors: Stoyan Kenderov, San Francisco, CA (US); Victor Tsype, Givetaim (IL)

(73) Assignee: Amdocs Software Systems Limited, Dublin (IE)

( * ) Notice: Subject to any disclaimer, the term of this patent is extended or adjusted under 35 U.S.C. 154(b) by 1463 days.

(21) Appl. No.: 11/562,901

(22) Filed: Nov. 22, 2006

(51) Int. Cl.
   *G06Q 3/00* (2006.01)
   *H04N 7/18* (2006.01)
   *G06F 3/00* (2006.01)

(52) U.S. Cl. .................... 348/150; 705/14.41; 725/46

(58) Field of Classification Search .................. 348/150; 705/14.41, 14.49; 725/42, 46, 34, 62
See application file for complete search history.

(56) References Cited

U.S. PATENT DOCUMENTS

| | | | |
|---|---|---|---|
| 7,895,076 B2 * | 2/2011 | Kutaragi et al. | 705/14.41 |
| 2004/0122730 A1 | 6/2004 | Tucciarone et al. | 705/14 |
| 2006/0167753 A1 | 7/2006 | Teague et al. | 705/14 |
| 2010/0082430 A1 * | 4/2010 | Ramer et al. | 705/14.49 |

* cited by examiner

*Primary Examiner* — Gims Philippe
(74) *Attorney, Agent, or Firm* — Zilka-Kotab, PC

(57) ABSTRACT

An advertising system, method and computer program product are provided. In use, behavior of a user is monitored. In addition, an option is presented to the user to receive advertisement content, where the advertisement content is selected based on the behavior.

21 Claims, 7 Drawing Sheets

SYSTEM, METHOD AND COMPUTER PROGRAM PRODUCT FOR PRESENTING AN OPTION TO RECEIVE ADVERTISEMENT CONTENT

FIELD OF THE INVENTION

The present invention relates to advertising, and more particularly to presenting options to receive advertisements.

BACKGROUND

Advertising has traditionally been a tool largely utilized by various companies to promote goods and/or services. Such advertising has included, for example, video advertisements (e.g. commercials), Internet advertisements, etc. In addition, advertisers are generally interested in presenting advertisements that are tailored (e.g. customized, personalized, etc.) to those receiving such advertisements. However, it is still difficult for advertisers to ensure that those receiving advertisements will be receptive to such advertisements.

There is thus a need for overcoming these and/or other problems associated with the prior art.

SUMMARY

An advertising system, method and computer program product are provided. In use, behavior of a user is monitored. In addition, an option is presented to the user to receive advertisement content, where the advertisement content is selected based on the behavior.

DETAILED DESCRIPTION

Figure 1:
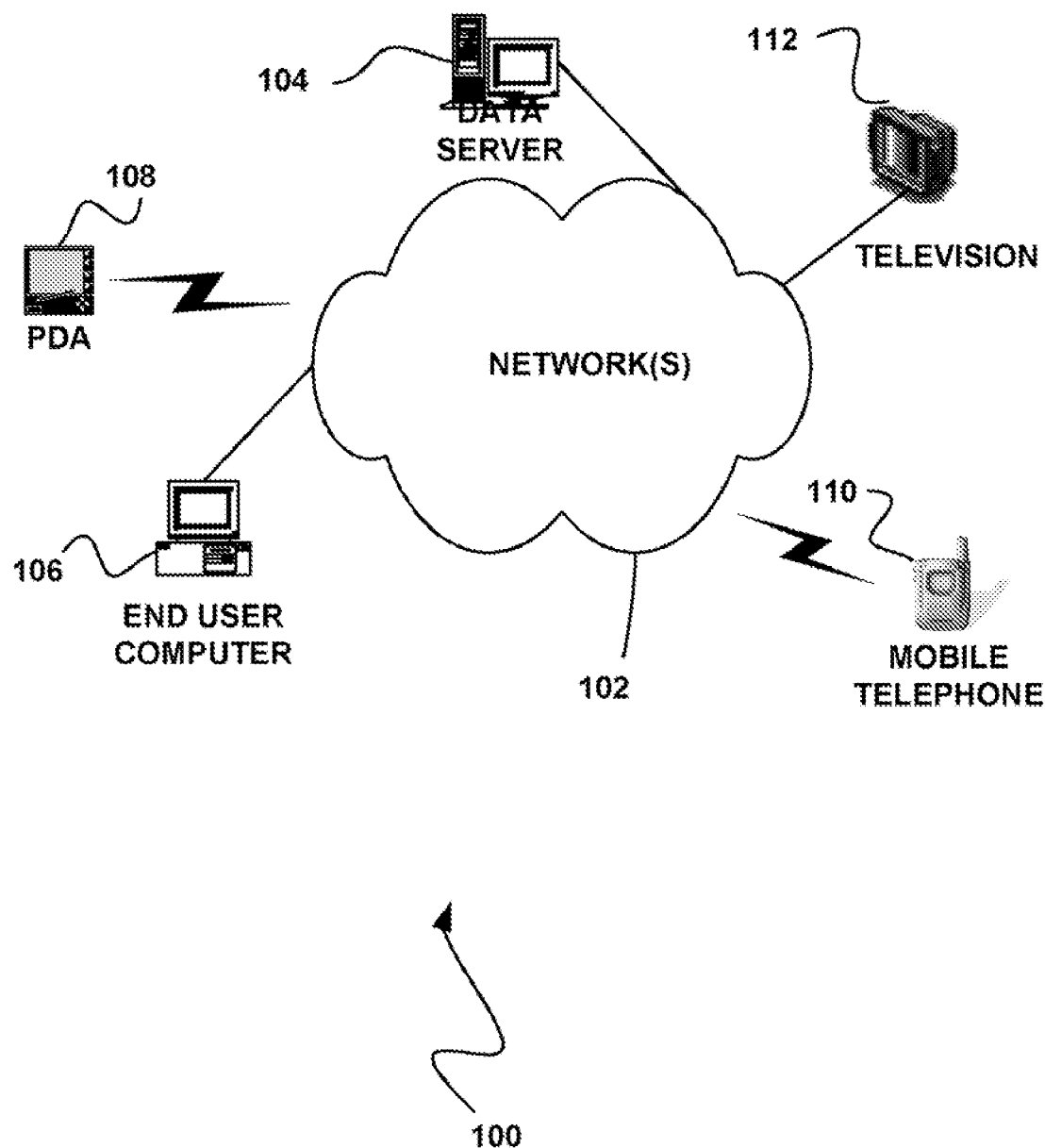
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
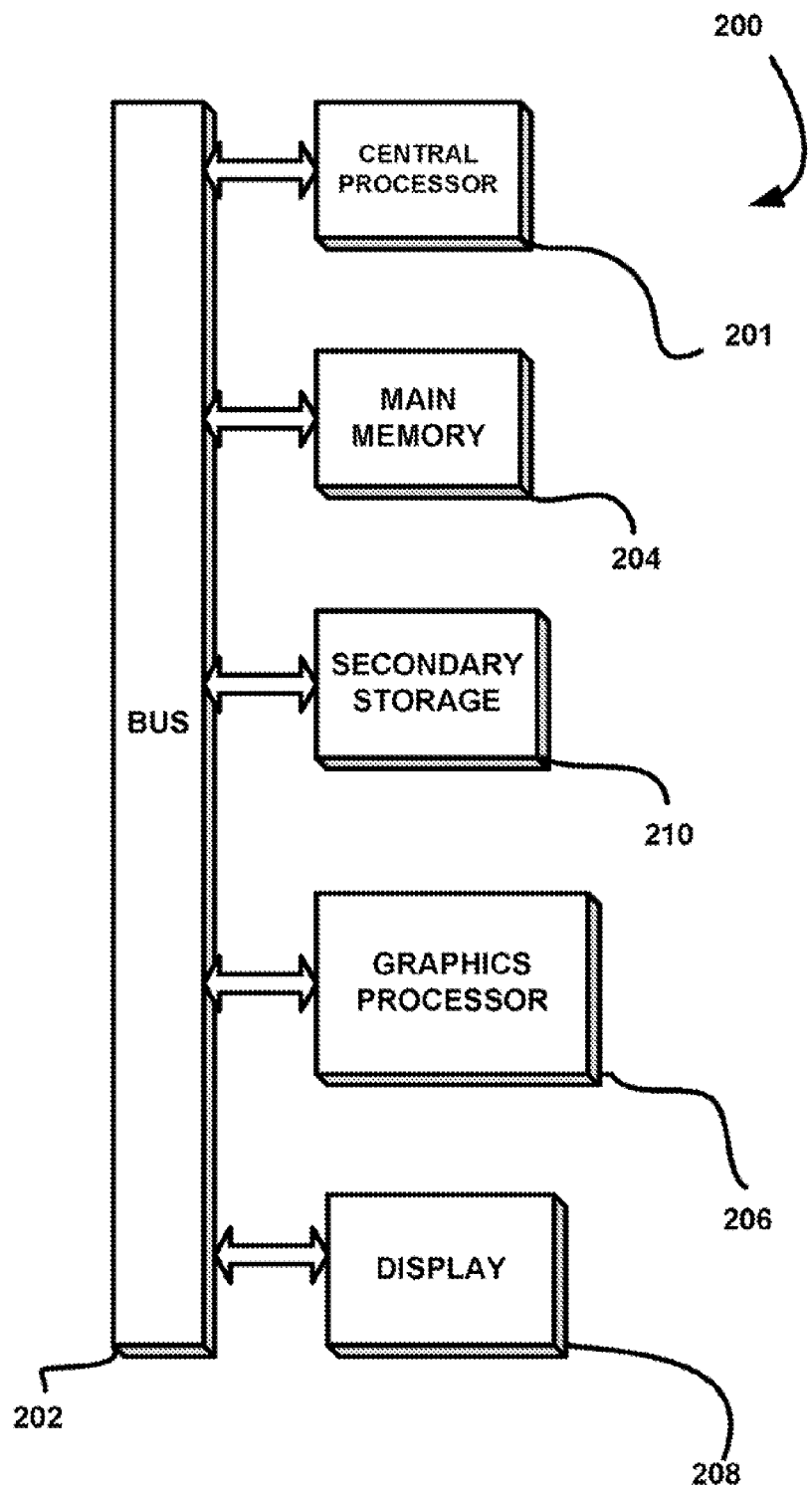
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
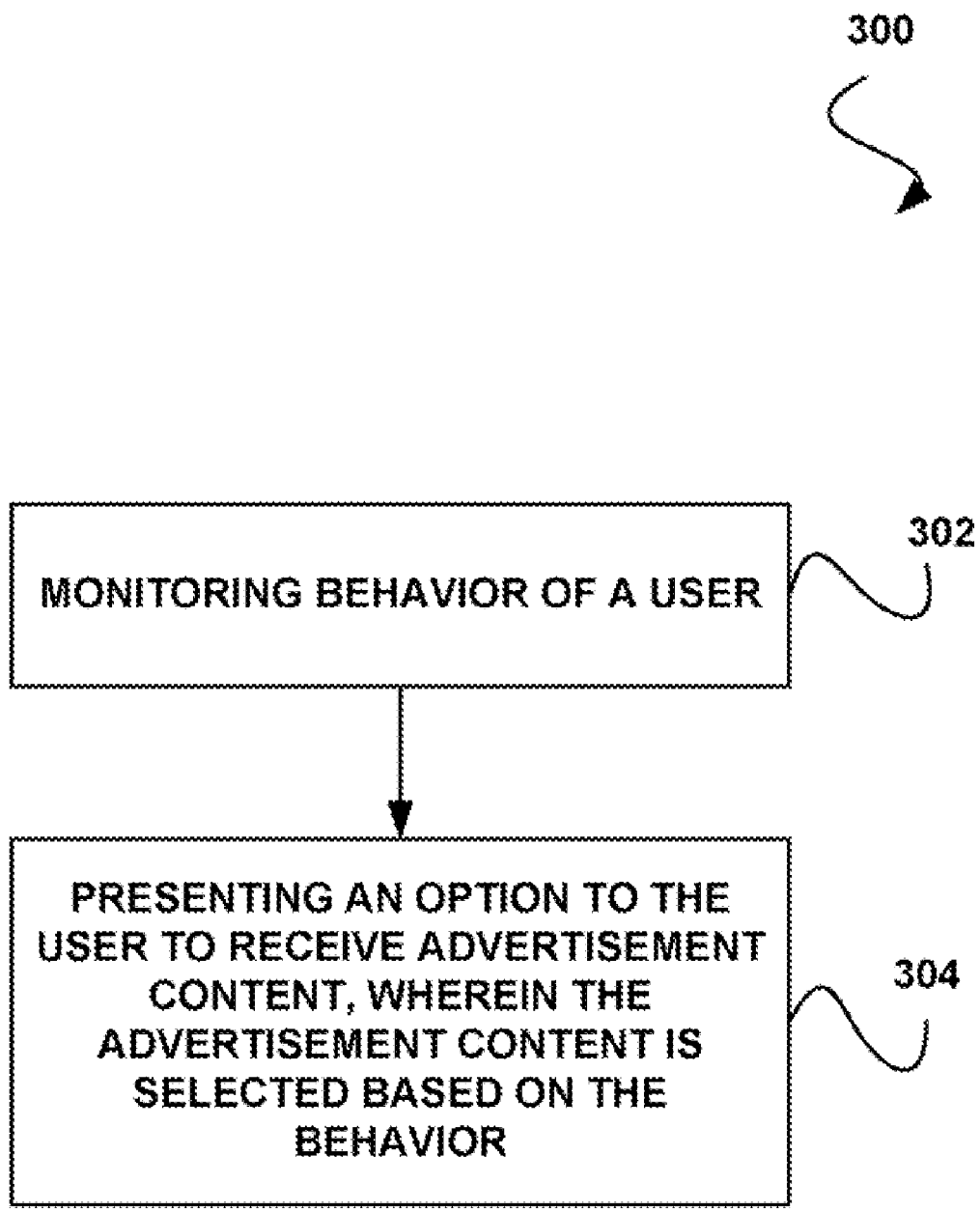
FIG. 3 shows a method for presenting an option to a user to receive advertisement content, in accordance with one embodiment.

FIG. 3 shows a method 300 for presenting an option to a user to receive advertisement content, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, behavior of a user is monitored. Such behavior may include any actions, reactions, activities, movement, demeanor, etc. associated with the user. In one embodiment, the behavior may include a current location of the user. For example, the location may be identified utilizing a global positioning system (GPS) utilized by the user. Optionally, such GPS may be associated with a mobile phone, car, etc. utilized by the user. Of course, however, the location may be identified in any desired manual and/or automatic manner (e.g. manual entry, triangulation, etc.).

In another embodiment, the behavior may include a query submitted by the user. Such query may optionally include a search for information that is performed over a network. Just by way of example, the query may include a search performed over the Internet utilizing a search engine (e.g. Google™, Yahoo®, MSN®, etc.). Further, the query may be submitted using a device connected to a network, such as for example any of the devices described above with respect to FIGS. 1 and/or 2.

In yet another embodiment, the behavior may include preferences manually input by the user or automatically gleaned in any desired manner. For example, such preferences may specify an interest in a particular category of information (e.g. types of restaurants, types of vacations, etc.), and/or may include any desired type of information capable of indicating a choice of the user. Accordingly, the behavior of the user may be monitored for identifying interests (e.g. categories of interest, services of interest, products of interest, etc.).

In addition, an option is presented to the user to receive advertisement content, where such advertisement content is selected based on the behavior of the user, as shown in operation 304. The option may include any opportunity for the user to select to receive the advertisement content. For example, in one optional embodiment, the option may include an option to opt-in to receive the advertisement content. In addition, the option may or may not be presented to the user in real-time.

Furthermore, the advertisement content may include any data capable of being presented (e.g. communicated, displayed, etc.) to the user for advertisement purposes. Such data may include, for example, promotional information, update information, discount coupons, a questionnaire/survey, etc. In addition, the advertisement content may be presented utilizing any desired type of device. For example, such device may include a television (e.g. connected to a cable service, etc.), a computer connected to a network, a mobile phone connected to a network, and/or any of the devices described above with respect to FIGS. 1 and/or 2. Of course, the advertisement content may be presented utilizing the same or a different device used in conjunction with behavior monitoring.

Still yet, in one embodiment, the advertisement content may be associated with an entity (e.g. government, company, organization, individual, etc.). Optionally, the advertisement content may promote a good and/or service provided by the entity. Thus, in one embodiment, the advertisement content may include a commercial associated with an entity.

Moreover, in one embodiment, the advertisement content may be selected based on the behavior of the user by identifying trends associated with the behavior of the user. For example, categories of advertisement content may be identified based on behavior of the user that is associated with such categories. In one embodiment, behavior that is repetitive may be utilized for identifying such advertisement content (e.g. a plurality of queries for a type of restaurant, a location frequently visited by the user, etc.).

Thus, the option that is presented to the user may include an option to receive a category of advertisement content that is associated with the user's behavior. It should be noted, however, that the advertisement content may be selected based on the user's behavior in any desired manner. In this way, a user may presented with an option to receive advertisement content that is appropriate to the user (e.g. associated with the user's interests, present location, etc.), therefore increasing the likelihood of receptiveness to such advertisement content.

More illustrative information will now be set forth regarding various optional architectures and features of different embodiments with which the foregoing framework of FIG. 3 may or may not be implemented, per the desires of the user. It should be strongly noted that the following information is set forth for illustrative purposes and should not be construed as limiting in any manner. Any of the following features may be optionally incorporated with or without the exclusion of other features described.

In one exemplary embodiment, the amount of advertisement content received by the user may be controlled based on a preference of the user. For example, the user may be associated with a preference that includes a threshold amount of advertisement content desired to be received. The threshold may be applicable to all advertisement content, a category of advertisement content (e.g. types of advertisement content, media platforms by which such advertisement content is presented, etc.), etc. Accordingly, an amount of advertisement content transmitted to the user may be based on the threshold amount of advertisement content.

In another exemplary embodiment, a price of presenting the advertisement content may be identified based on the user's preferences. Just by way of example, a preference for a low threshold amount of advertisement content may set the price for such advertisement content higher than if the threshold amount of advertisement content was higher. In this way, advertisers may be charged according to preferences of users.

In yet another exemplary embodiment, users may be paid for allowing the insertion of advertisement content into their outgoing messages [e.g. SMS messages, multi-media messaging service (MMS) messages, electronic mail (e-mail) messages, etc.]. For example, the users may be paid by advertisers associated with such advertisement content. Optionally, the users may be paid via a credit to service accounts utilized by such users to transmit the outgoing messages, as will be described in more detail with respect to FIG. 5.

Figure 4:
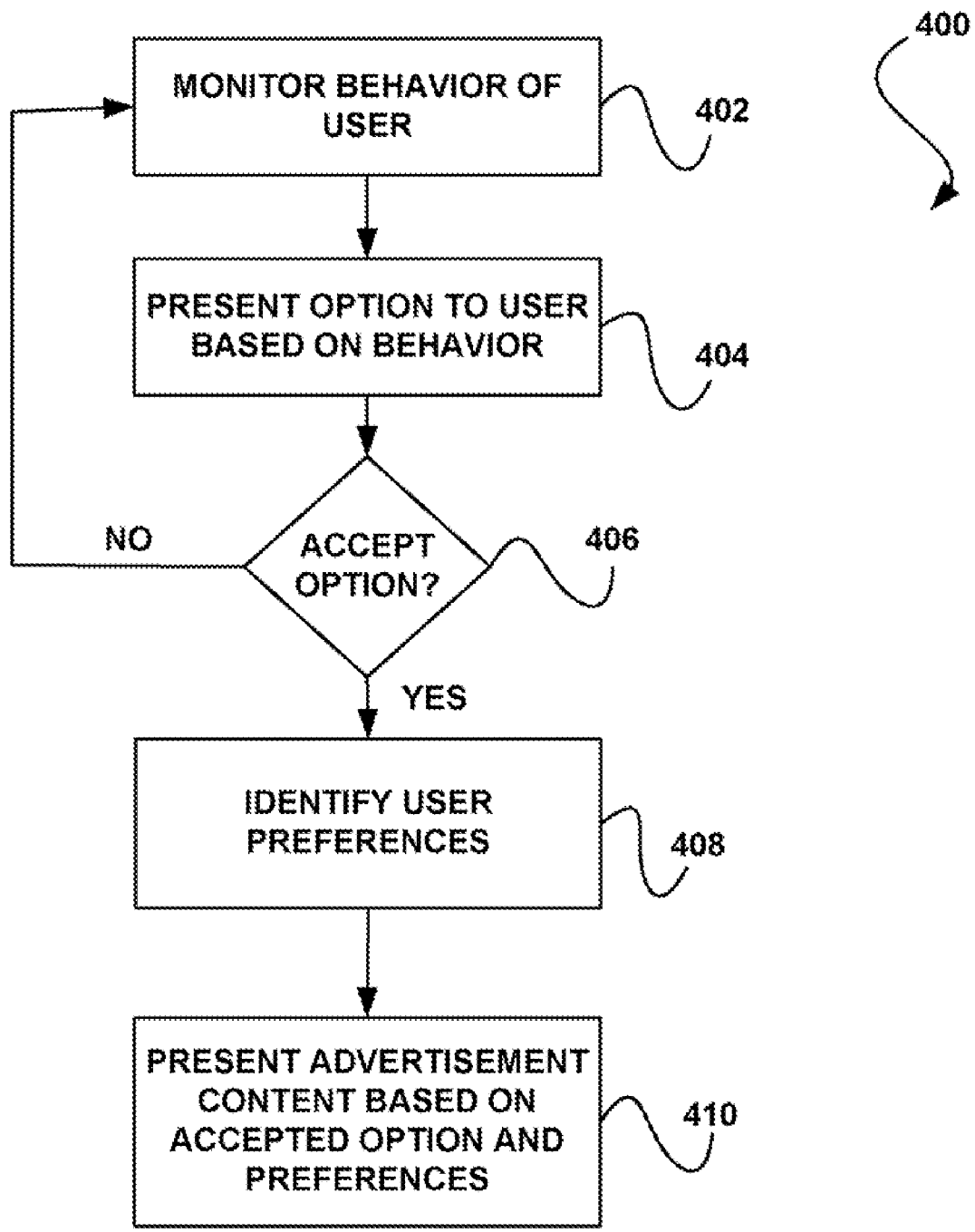
FIG. 4 shows a method for presenting advertisement content to a user based on options and preferences associated with the user, in accordance with another embodiment.

FIG. 4 shows a method 400 for presenting advertisement content to a user based on options and preferences associated with the user, in accordance with another embodiment. As an option, the method 400 may be implemented in the context of the details of FIGS. 1-3C. Of course, however, the method 400 may be carried out in any desired environment. Again, the aforementioned definitions may equally apply to the description below.

As shown in operation 402, behavior of a user is monitored. The behavior of the user may be monitored in any desired manner. In one embodiment, the behavior of the user may be monitored utilizing an agent stored on a device utilized by the user. In another embodiment, the behavior may be monitored by service providers providing a service to the user (e.g. mobile phone service, Internet service, etc.).

In addition, an option to receive advertisement content is presented to the user based on the behavior, as shown in operation 404. The option may include any option that is capable of being accepted by the user. For example, the option may be presented to the user utilizing an interactive device (e.g. mobile phone, cable television, computer, etc.). Thus, the user may optionally select the option for indicating acceptance thereof.

In addition, the option may include an option to opt-in to receive advertisement content. Moreover, the advertisement content may be associated with a particular category of advertisement content. Thus, the option may allow the user to accept periodic presentations of advertisement content. Also, the option may be created by a service provider that provides a service to the user, but of course may also be created by any entity capable of presenting, either directly or indirectly, the option to the user.

Further, the option that is presented to the user may be identified from a plurality of options. In one embodiment, the plurality of options may be stored in a database, where such options are associated with categories (e.g. types of advertisement content, sources of advertisement content, etc.). In this way, the option that is presented to the user may be identified as being associated with the user behavior by associating a category of the option with the user behavior (e.g. with a category associated with the user behavior, etc.).

It is then determined whether the user has accepted the option, as shown in decision 406. If it is determined that the user has not accepted the option, then the user's behavior may continue to be monitored and/or additional options may be presented to the user. In one embodiment, determining that the user has not accepted the option may indicate that the user has opted-out of receiving advertisement content associated with such option. Thus, the advertisement content may not be presented to the user.

If, however, it is determined that the user has accepted the option, then user preferences are identified. Note operation 408. The user preferences may include any preferences of the user. In one embodiment, the user preferences may include a preference to only receive up to a specified threshold amount of advertisement content for a particular period of time (e.g. total, per day, per hour, etc.). For example, the threshold may include one instance of advertisement content presented per day, two instances of advertisement content presented per week, etc.

In one embodiment, such threshold may be applicable to all advertisement content presented to the user. In another embodiment, the threshold may be applicable to advertisement content that is presented to the user based on the acceptance of the particular option. In this way, the user may optionally specify a threshold for each option accepted. In yet another embodiment, the user may specify a different threshold for each class of advertisers and/or each particular advertiser presenting advertisement content.

Of course, it should be noted that such threshold may also be automatically increased based on a request by the user to receive advertisement content. For example, the user may manually select to receive an offer (e.g. a coupon from a web advertisement, more information associated with an advertisement presented on television, etc.), such that the threshold may be automatically increased to allow for the receipt of such offer in addition to the receipt of an amount of offers within the original threshold preferred by the user. Further, the automatic increase may be temporary, such that the original threshold preferred by the user may be re-established for the next period of time for which such threshold is applicable.

In another embodiment, the user preferences may include a preference to receive advertisement content at a particular device. In this way, the user may specify to which device advertisement content is to be transmitted. As another option, the user may specify a plurality of devices to which advertisement content is to be transmitted. Still yet, the preferences may include a preference to receive advertisement content in conjunction with messages received from specified addresses (e.g. e-mail addresses, phone numbers, etc.). Moreover, the preferences may include a preference of a time of day in which advertisement content may be presented.

Still yet, the advertisement content is presented to the user based on the accepted option and the user preferences, as shown in operation 410. In this way, the advertisement content may be conditionally presented to the user based on an acceptance of the option by the user. Moreover, the advertisement content may be presented to the user as specified by the user preferences. Thus, users may limit the amount of advertisement content received. Still yet, in one embodiment the advertisement content may be presented to the user in conjunction with other data (e.g. search results from a query made by the user, etc.).

Optionally, a price for presenting the advertisement content to the user may be calculated. Such price may include any price charged to an advertiser and/or any other entity associated with the advertisement content. In one embodiment, the price may be dynamically calculated as a function of preferences of the user. For example, the price of presenting the advertisement content may be based on the user's threshold of advertisement content willing to be received. Thus, a low threshold may increase the price of presenting advertisement content since the supply associated therewith is low.

In another embodiment, real-time auction based pricing may be utilized for calculating the price of presenting the advertisement content. For example, advertisers may bid on advertising slots (e.g. each advertisement content space available based on the user threshold, etc.) in which advertisement content may be presented to the user. In still yet another embodiment, the price may be based on a value of the user. Such value may optionally be based on a location of the user, a demographic of the user, and/or any other information capable of being associated with the user. Of course, it should be noted, however, that the price of presenting the advertisement content may be calculated in any desired manner.

In one exemplary embodiment, various options, such as "Italian restaurant offers in your ZIP code area", "Every day coffee discount coupons at your local coffee shop", or "Discounted theater tickets in your city" may be presented to a user based on the user's behavior (e.g. query associated with Italian restaurants/coffee/theater, a location of the user, etc.). In another embodiment, an offer to opt-in to receive "Italian restaurant offers in your zip code area" may be presented to a user. If the user accepts the option (e.g. opts-in), the user may receive periodic offers associated with Italian restaurants in the user's zip code area.

In addition, if the user is associated with a preference that such offers be received utilizing the user's mobile phone, then the service provider associated with the mobile phone may transmit such offers to the user's mobile phone. Of course, the option may also optionally specify the zip code area associated with offers that may be presented when the user is located in such zip code area. In this way, the offers may be presented to the user when the mobile phone service provider determines that the user is in the particular zip code area associated with the accepted option.

As another example, a location of the user may be determined based on a picture taken by the user utilizing the user's mobile phone. An option for receiving advertisement content associated with restaurants, event updates, etc. may then be presented to the user utilizing the mobile phone. For example, such option may be accepted by pressing a button on the mobile phone. In addition to accepting the option, the user may set preferences limiting the amount and/or time limit for which offers associated with the option may be presented.

Figure 5:
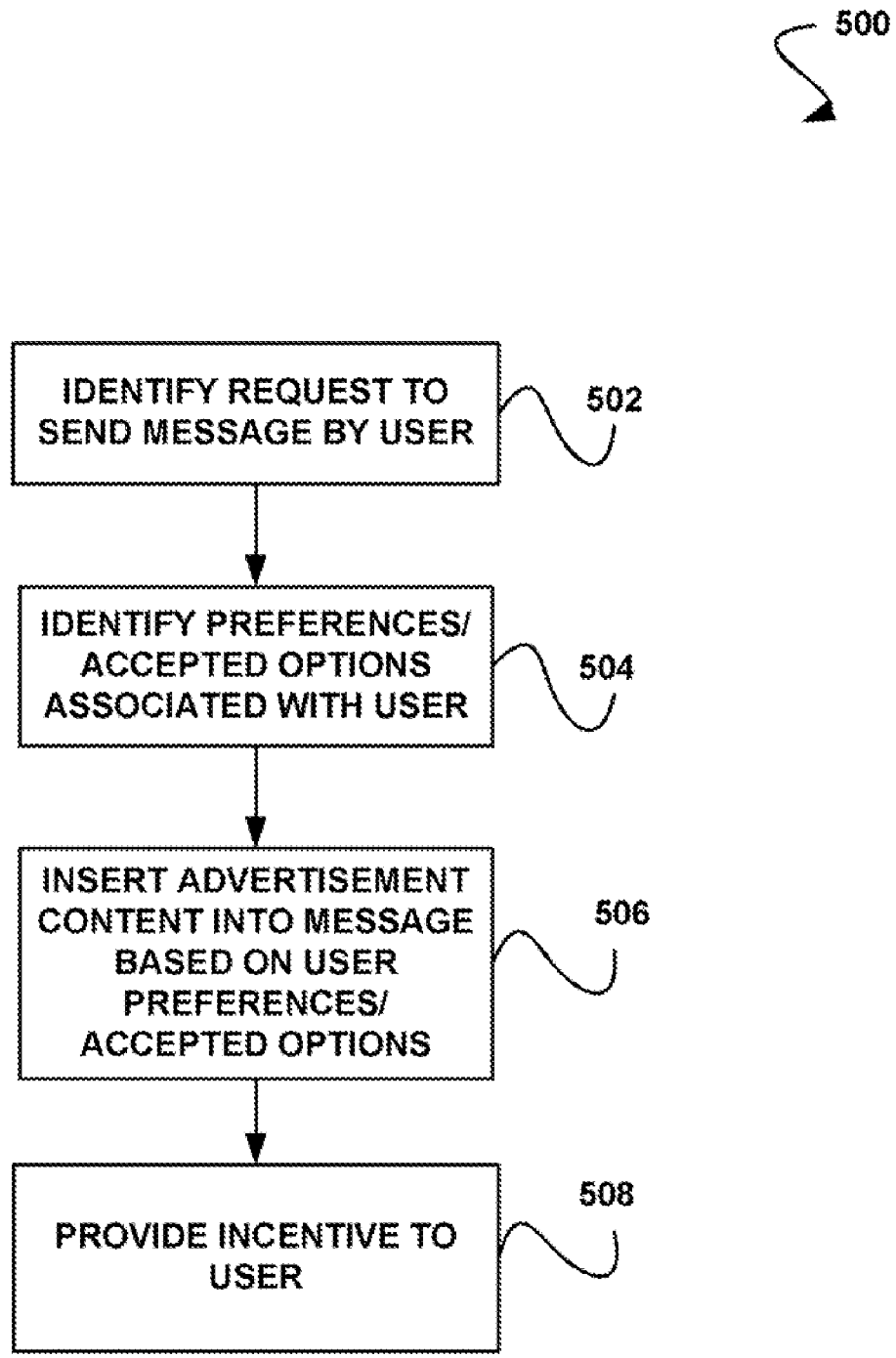
FIG. 5 shows a method for providing an incentive to a user for allowing the insertion of an advertisement into a message, in accordance with yet another embodiment.

FIG. 5 shows a method 500 for providing an incentive to a user for allowing the insertion of an advertisement into a message, in accordance with yet another embodiment. As an option, the method 500 may be implemented in the context of the details of FIGS. 1-4. Of course, however, the method 500 may be carried out in any desired environment. Again, the aforementioned definitions may equally apply to the description below.

As shown in operation 502, a request by a user to send a message is identified. The message may include any type of message capable of being sent by a user utilizing a device, such as any of the devices described above with respect to FIGS. 1 and/or 2. Just by way of example, the message may include an e-mail message, an SMS message, and MMS message, etc. Thus, the request to send the message may be made by the user utilizing a service provided by a service provider (e.g. e-mail service, mobile phone service, Internet service, etc.).

In addition, preferences and accepted options associated with the user are identified, as shown in operation 504. Such preferences may include preferences associated with sending messages. For example, the preferences may include a threshold associated with an amount of advertisement content to be transmitted in messages sent by the user. Thus, the user may limit an amount of advertisement content transmitted from a device associated with the user.

As another option, the preferences may include preferences of specific types of categories of advertisement content (e.g. sports, leisure, products, discount coupons for restaurants, etc.) that the user may desire to transmit via messages sent by such user. Moreover, types of advertisement content transmitted utilizing messages sent from the user may be limited based on options accepted by the user. Still yet, the preferences may include preferences of particular addresses (e.g. e-mail addresses, telephone numbers, addresses in an electronic address book, etc.) to which messages with advertisement content may be sent.

Advertisement content is then included in association with the message based on the preferences and the accepted options, as shown in operation 506. The advertisement content may be inserted into the message in any desired manner. For example, the advertisement content may be attached to the message, embedded in the message, etc. In this way, the advertisement content may be inserted into the message prior to sending the message to an intended recipient, such that the intended recipient may receive the message and the advertisement content.

Further, as shown in operation 508, an incentive is provided to the user. The incentive may be provided by an advertiser associated with the advertisement content inserted into the message. Of course, the incentive may also be provided by any other entity associated with the advertisement content.

In one embodiment, the incentive may include a payment to the user. Thus, the advertisement may be inserted into the message in exchange for payment to the user. For example, the payment may include a deposit in a bank account, credit account, etc. of the user.

As another example, the payment may include a credit to a subscription to a service utilized in sending the message. In particular, such service may include any service for which the user is charged. Just by way of example, the service may include a mobile phone service, an Internet service, a cable television service, etc. Accordingly, the user's subscription fees may be sponsored, at least in part, by inserting advertisement content into messages.

As yet another example, the payment may include a bonus provided to the user. Such bonus may include additional SMS messages, downloads, web browsing minutes, etc. added to the subscription of the user to the associated service utilized in sending the message. Optionally, interactive advertisement content received by the user may also be sponsored in exchange for interaction by the user with the advertisement content, in a similar manner as described above.

Figure 6:
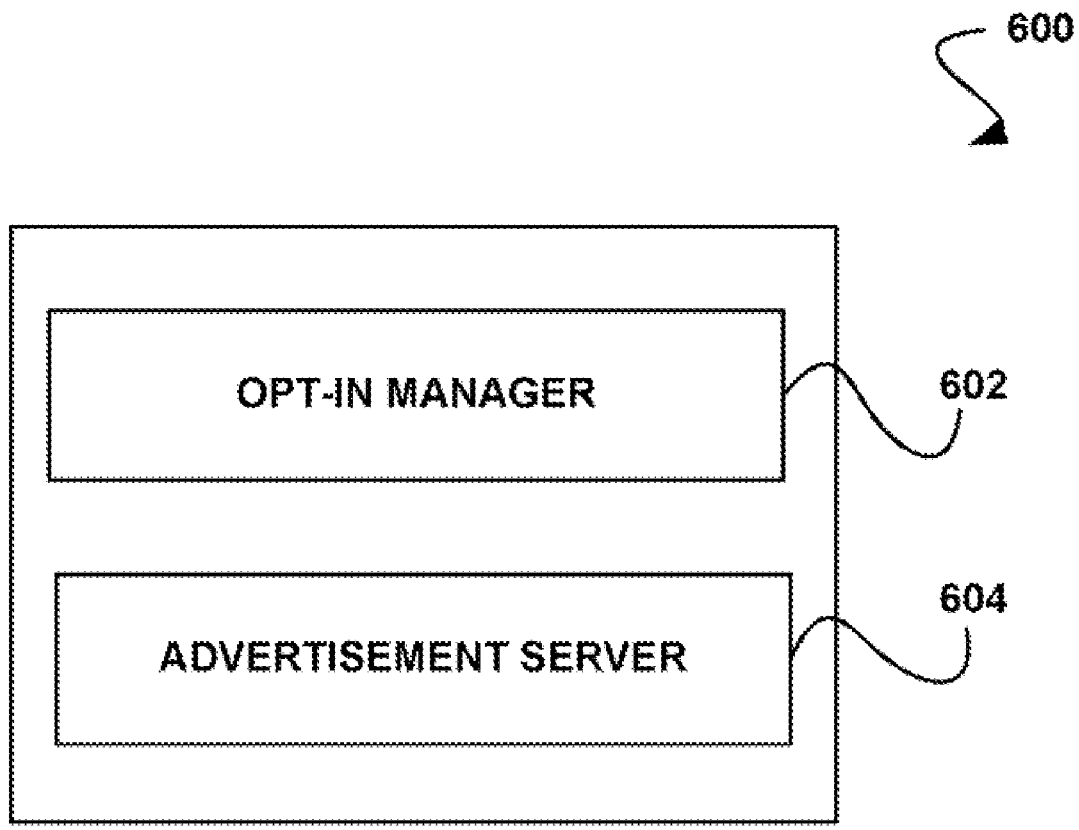
FIG. 6 shows a modular system for presenting advertisement content based on options accepted by a user, in accordance with yet another embodiment.

FIG. 6 show a modular system 600 for presenting advertisement content based on options accepted by a user, in accordance with yet another embodiment. As an option, the modular system 600 may be implemented in the context of the details of FIGS. 1-5. Of course, however, the modular system 600 may be implemented in any desired environment. Again, the aforementioned definitions may equally apply to the description below.

As shown, the modular system 600 includes an opt-in manager 602 and an advertisement server 604. The opt-in manager 602 may include a central repository for storing information associated with accepted and/or rejected options and preferences associated with a user. Thus, the opt-in manager 602 may include any application (e.g. computer code. etc.) capable of presenting an option to a user to receive advertisement content and capable of allowing the user to specify preferences.

For example, such preferences may include advertisement content categories (e.g. associated with advertisement content the user desires to receive, associated with the advertisement content the user does not desire to receive, etc.), a threshold amount of advertisement content associated with a specified time period, a frequency for which advertisement content is to be received, a time of day during which advertisement content is to be received, addresses for which advertisement content is to be received and/or sent by the user, etc. The opt-in manager 602 may further allow the user to select a desired incentive for sending messages with advertisement content inserted therein. Further, the opt-in manager 602 may interface with the advertisement server 604.

The advertisement server 604 may present advertisement content to the user. For example, the advertisement server 604 may insert the advertisement into messages sent and/or received by the user. Such advertisement server 604 may present the advertisement content to the user based on the preferences and options accepted by the user that are stored in association with the opt-in manager 602.

The advertisement server 604 may then compare the preferences and accepted options to a location of the user, behavior of the user, advertising contract attributes associated with advertisers, privacy rules associated with a service subscription of the user, etc. In this way, the advertisement server 604 may present appropriate advertisement content to the user and/or may insert appropriate advertisement content into a message associated with the user in real-time. In this way, the advertisement content may be presented in a manner that increases the likelihood that the user will be receptive thereto.

Moreover, behavior information associated with the presented advertisement content may be identified. For example, such behavior information may include information on whether a user interacted with the advertisement content, whether a user called an advertiser based on the advertisement content, whether there was no activity associated with the presentation of the advertisement content, etc. Thus, such behavior information may optionally be utilized for calculating a price of the presentation of the advertisement content.

Figure 7:
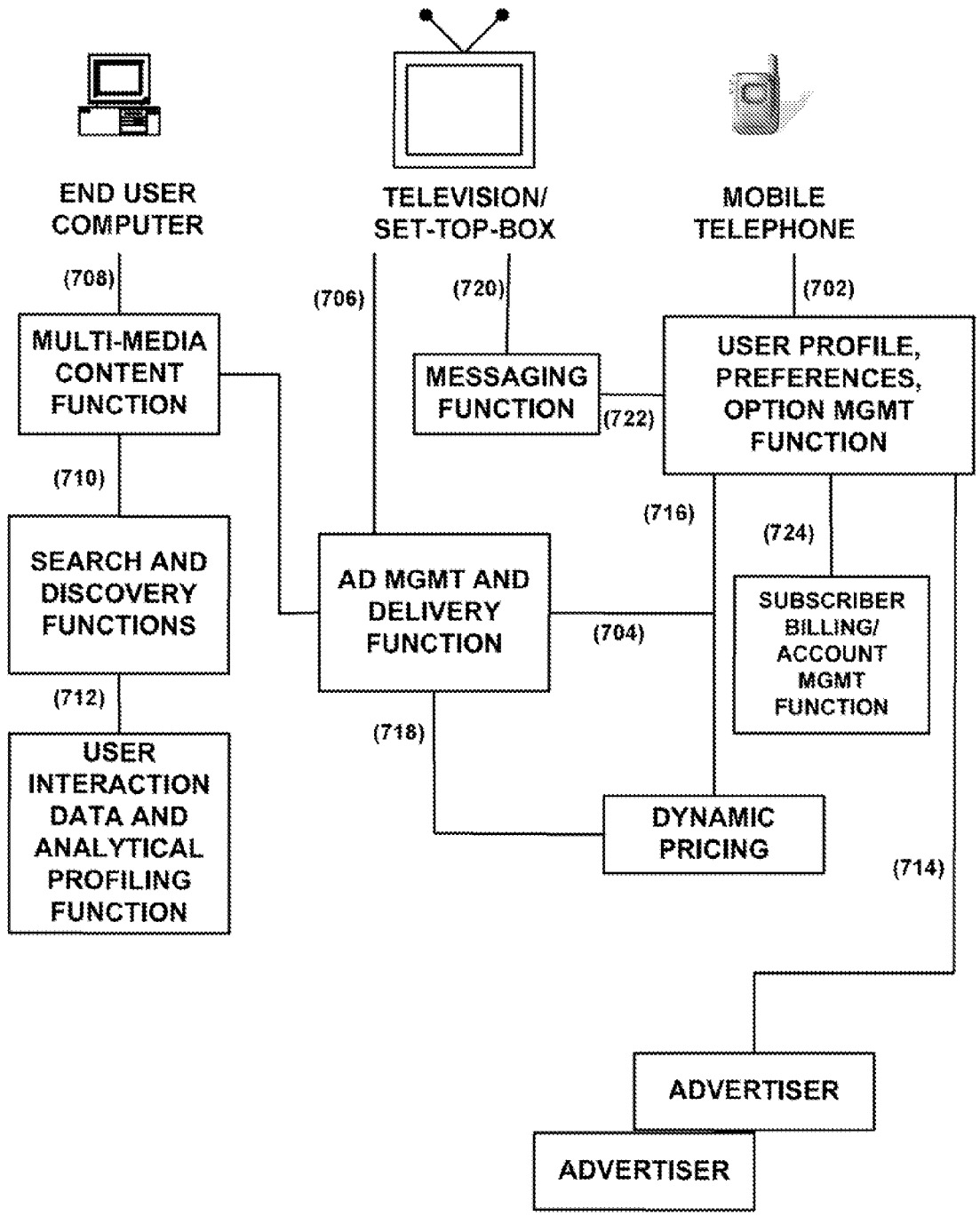
FIG. 7 shows a system for presenting advertisement content to a user based on options and preferences associated with the user, in accordance with still yet another embodiment.

FIG. 7 shows system 700 for presenting advertisement content to a user based on options and preferences associated with the user, in accordance with still yet another embodiment. As an option, the advertisement system 700 may be implemented in the context of the details of FIGS. 1-6. Of course, however, the advertisement system 700 may be carried out in any desired environment. Again, the aforementioned definitions may equally apply to the description below.

As shown in operation 702, a user may utilize a mobile phone to view preferences, modify preferences, etc. Any modifications are then transmitted from a user profile, preferences and option management function to an advertisement management and delivery function, as shown in operation 704. In one embodiment, advertisement content is presented to the user via a television with a set-top-box (e.g. television with cable box, etc.) based on accepted options and preferences of the user, as shown in operation 706.

In another embodiment, options are presented to the user according to user behavior, as shown in operation 708. Such user behavior (e.g. user location, user queries, etc.) may be monitored utilizing search and discovery functions (operation 710), and data associated therewith may utilized by the user interaction data and analytical profiling function (operation 712) for identify options applicable to the user. Furthermore, the user interaction data and analytical profiling function may also be utilized for identifying search results associated with any query submitted by the user. In this way, the identified options and/or search results may be transmitted to a multi-media content function which presents such options to the user via a computer. Note operation 708.

The multi-media content function may also receive acceptances of options by the user utilizing the computer (operation 708). In addition, the multi-media content function may optionally identify any changes to previously accepted options based on options presented to the user. For example, the multi-media content function may change existing accepted options based on the acceptance and/or refusal to accept a presented option. In this way, options associated with the user may be updated each time a new option is presented to the user.

As also shown, advertisers may register their advertisement content (operation 714) and purchase advertising slots for presenting their advertisement content. As shown, the user profile, preferences and option management function, along with advertisement campaign and delivery function may provide information to the dynamic pricing management function such that the dynamic pricing management function may dynamically calculate a price for presenting advertisement content (operations 716 and 718).

The dynamic pricing management function may additionally transmit any dynamic price changes to the advertisement management and delivery function, such that the advertisement management and delivery function may prioritize existing advertisement content received by advertisers (operation 718). Such prioritization may specify the order of advertisement content that is to be presented to the user.

Along with viewing and modifying preferences utilizing the user profile, preferences and option management function, the user may also create, view and modify subscriptions to services that may be credited in exchange for allowing the insertion of advertisement content into messages associated with the user (see operation 704). In addition, the user may set criteria for receiving such credits. Thus, a messaging function may receive a request to transmit a message from a user, as shown in operation 720.

In response to the receipt of a request to transmit a message, the messaging function requests advertisement content from the user profile, preferences and option management function, as shown in operation 722. The user profile, preferences and option management function posts credits to the subscriber billing/account management function based on advertisement content inserted into the message requested to be transmitted by the user. Note operation 724.

The messaging function is then able to send the user's message with the advertisement content inserted therein. It should be noted that while specific devices are described with respect to the present description, any desired combination of devices may be utilized for receiving input from and generating output to a user.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   monitoring, utilizing a processor, a behavior of a user;
   identifying at least one of a plurality of options that are each associated with at least one of a plurality of categories, where the at least one of the plurality of options is identified based on the behavior of the user;
   presenting the at least one option to the user to receive advertisement content;
   determining whether the user has accepted the at least one option;
   if it is determined that the user has not accepted the at least one option:
     continuing to monitor the behavior of the user,
     identifying at least another one of the plurality of options based on the behavior of the user, and
     presenting the at least another one of the plurality of options to the user to receive the advertisement content;
   if it is determined that the user has accepted the at least one option, identifying user preferences of the user that include a threshold amount of the advertisement content;
   selecting the advertisement content, based on the behavior of the user;
   transmitting the advertisement content to the user;
   controlling an amount of the advertisement content transmitted to the user, based on the threshold amount of the advertisement content;
   identifying a request to send a message initiated by the user;
   identifying at least one message preference of the user in association with message advertisements;
   identifying at least one accepted option of the user in association with the message advertisements; and
   including an advertisement in association with the message, based on the at least one message preference and the at least one accepted option.

2. The method of claim 1, wherein the behavior of the user includes a current location of the user.

3. The method of claim 1, wherein the behavior of the user includes a query submitted by the user.

4. The method of claim 1, wherein the at least one option includes an opt-in option.

5. The method of claim 4, wherein the opt-in option allows the user to opt-in to receive the advertisement content.

6. The method of claim 1, wherein the presenting the at least one option to the user to receive the advertisement content includes presenting an option to the user to receive a category of the advertisement content.

7. The method of claim 1, and further comprising automatically increasing the threshold amount of the advertisement content based on a request by the user to receive the advertisement content.

8. The method of claim 1, and further comprising identifying a price of presenting the advertisement content based on the user preferences of the user.

9. The method of claim 1, wherein the message includes a short message service (SMS) message.

10. The method of claim 1, wherein the advertisement is included in association with the message based on the user preferences of the user.

11. The method of claim 1, wherein the advertisement is included in association with the message in exchange for payment to the user.

12. The method of claim 11, wherein the payment includes a credit to a subscription to a service associated with the user utilized in transmitting the message.

13. The method of claim 1, wherein the plurality of categories relate to types of advertisement content.

14. The method of claim 1, wherein the plurality of categories relate to sources of advertisement content.

15. The method of claim 1, wherein the at least one of the plurality of options that is presented to the user is identified as being associated with the behavior of the user by associating the at least one category of the at least one option with the behavior of the user.

16. The method of claim 1, wherein the user is capable of specifying a different threshold for each of a plurality of the options that are accepted by the user.

17. The method of claim 1, wherein the user preferences include a preference to only receive up to a specified threshold amount of the advertisement content for a particular period of time.

18. A computer program product embodied on a computer readable medium, comprising:
- computer code for monitoring a behavior of a user;
- computer code for identifying at least one of a plurality of options that are each associated with at least one of a plurality of categories, where the at least one of the plurality of options is identified based on the behavior of the user;
- computer code for presenting the at least one option to the user to receive advertisement content;
- computer code for determining whether the user has accepted the at least one option;
- computer code for, if it is determined that the user has not accepted the at least one option:
  - continuing to monitor the behavior of the user,
  - identifying at least another one of the plurality of options based on the behavior of the user, and
  - presenting the at least another one of the plurality of options to the user to receive the advertisement content;
- computer code for, if it is determined that the user has accepted the at least one option, identifying user preferences of the user that include a threshold amount of the advertisement content;
- computer code for selecting the advertisement content, based on the behavior of the user;
- computer code for transmitting the advertisement content to the user;
- computer code for controlling an amount of the advertisement content transmitted to the user, based on the threshold amount of the advertisement content;
- computer code for identifying a request to send a message initiated by the user;
- computer code for identifying at least one message preference of the user in association with message advertisements;
- computer code for identifying at least one accepted option of the user in association with the message advertisements; and
- computer code for including an advertisement in association with the message, based on the at least one message preference and the at least one accepted option.

19. A system, comprising:
an output device for:
- presenting at least one of a plurality of options to a user to receive advertisement content; and
- presenting at least another one of the plurality of options to the user to receive the advertisement content if it is determined that the user has not accepted the at least one option; and a processor in communication with the output device for:
- monitoring a behavior of the user;
- identifying the at least one of the plurality of options presented to the user, each of the plurality of options associated with at least one of a plurality of categories, where the at least one of the plurality of options is identified based on the behavior of the user;
- determining whether the user has accepted the at least one option;
- if it is determined that the user has not accepted the at least one option:
  - continuing to monitor the behavior of the user, and
  - identifying the at least another one of the plurality of options based on the behavior of the user;
- if it is determined that the user has accepted the at least one option, identifying user preferences of the user that include a threshold amount of the advertisement content;
- selecting the advertisement content, based on the behavior of the user;
- transmitting the advertisement content to the user;
- controlling an amount of the advertisement content transmitted to the user, based on the threshold amount of the advertisement content;
- identifying a request to send a message initiated by the user;
- identifying at least one message preference of the user in association with message advertisements;
- identifying at least one accepted option of the user in association with the message advertisements; and
- including an advertisement in association with the message, based on the at least one message preference and the at least one accepted option.

20. The system of claim 19, and further comprising: a display and memory coupled to the processor via a bus.

21. The method of claim 1, wherein the user preferences include a preference to receive the advertisement content at a particular device.

* * * * *